Figure 1:
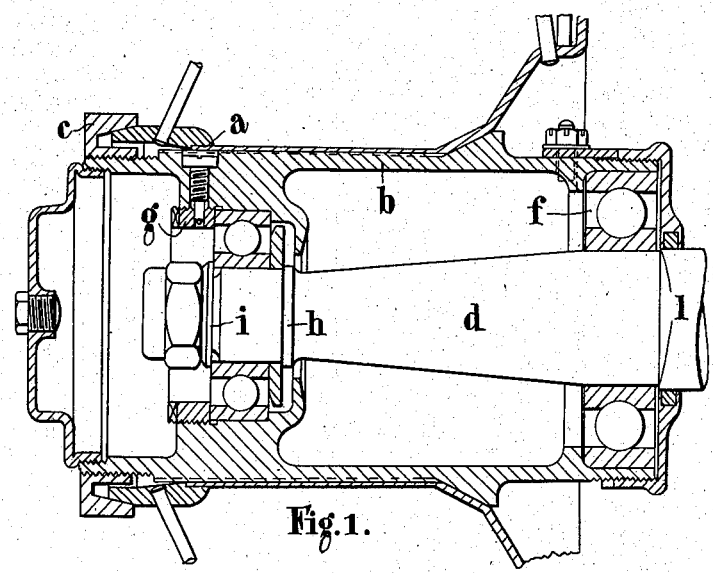

J. V. PUGH.
DETACHABLE WHEELS AND FITTING VEHICLES THEREWITH.
APPLICATION FILED AUG. 18, 1913.

1,171,244.

Patented Feb. 8, 1916.
4 SHEETS—SHEET 1.

WITNESSES
Mehrling Stahl.
C. E. Parsons

INVENTOR
John V. Pugh.
By Spear, Middleton, Donaldson & Spear
ATTORNEYS.

J. V. PUGH.
DETACHABLE WHEELS AND FITTING VEHICLES THER[EWITH.]
APPLICATION FILED AUG. 18, 1913.
1,171,244.
Patented Feb. 8, 1916.
4 SHEETS—SHEET 2.
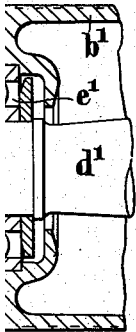
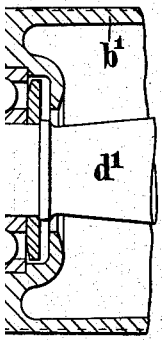
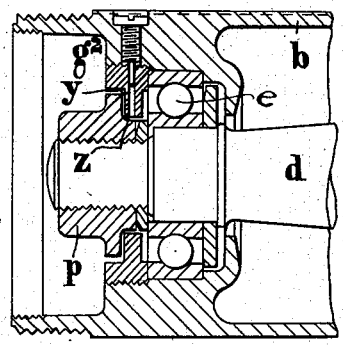
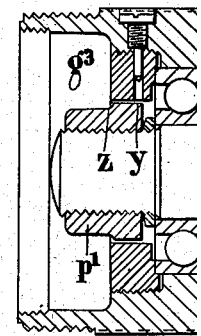
Fig.6.
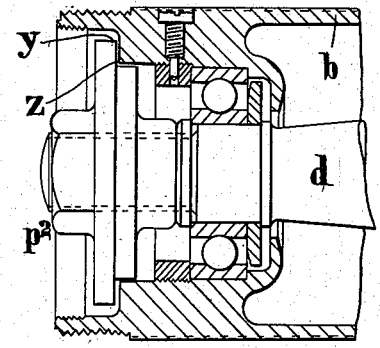
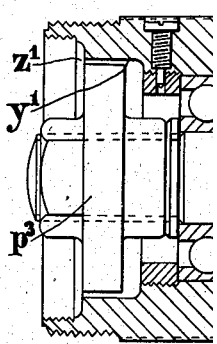
Fig.8.
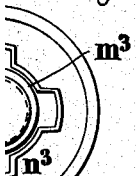
Fig.11.
Fig.12.
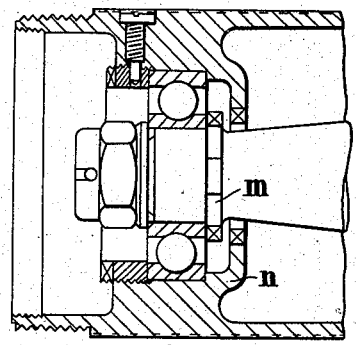
Fig.10.
Inventor:
John V. Pugh.
Witnesses

UNITED STATES PATENT OFFICE.

JOHN VERNON PUGH, OF COVENTRY, ENGLAND.

DETACHABLE WHEELS AND FITTING VEHICLES THEREWITH.

1,171,244. Specification of Letters Patent. Patented Feb. 8, 1916.

Application filed August 18, 1913. Serial No. 785,396.

*To all whom it may concern:*

Be it known that I, JOHN VERNON PUGH, a subject of the King of Great Britain and Ireland, residing at Guiting House, Allesley, Coventry, in the county of Warwick, England, have invented certain new and useful Improvements in and Relating to Detachable Wheels and in Fitting Vehicles Therewith, of which the following is a specification.

This invention relates to detachable wheels of the type described in my British Patents Nos. 18048/1911, 21275/1911, 20993/1912, in which the rotation of the wheel in the forward movement of the vehicle is utilized automatically to tighten up the securing nut which retains the outer upon the inner hub part by a screw thread or like engagement with one of the hub parts. In such wheels it is usual to differentiate between the screw threads of the parts for exclusive use on opposite sides of the vehicle in such a manner that the similar rotation of the nuts relative to the hub parts may produce axial movement in the direction necessary for tightening up the nuts and retaining the outer upon the inner hub parts on both sides of the vehicle. Under these circumstances it will be seen that if by any misunderstanding a part intended for exclusive use upon one side of the vehicle is affixed upon the other side the action which was intended to tighten up the nut will be acting to untighten it and serious trouble may result.

The object of the present invention is to render it impracticable for any one to commit an error of the foregoing type.

The invention consists in a method of mounting a detachable wheel or wheels of the foregoing type upon one or both of the sides of a vehicle according to which the connecting or co-acting portions of the co-operating members are so constructed that no member intended for use upon one side of the vehicle only can be affixed upon the other side.

The invention further consists in means for mounting a detachable wheel or wheels of the foregoing type upon one or both of the sides of a vehicle, said means comprising an inner hub part or parts and fittings directly or indirectly appertaining to the mounting or operation of said wheel or wheels, in which the connecting or co-acting portions are so constructed that no member intended for use upon one side of the vehicle only can be affixed upon the other side.

The invention also consists in improvements in detachable wheel parts and appertaining fittings related thereto, as hereinafter described.

The underlying idea of this invention may be illustrated by imagining a car is constructed as a Rolls-Royce car on one side, and as a Napier on the other side, that is, with totally different parts to which the detachable wheels are connected, while at the same time employing detachable wheels having hub parts and lock nuts of the same size in all four wheel positions.

In order to carry out the invention it will be necessary that in addition to the permanent hub parts those portions to which they are attached shall also only be applicable to the correct side of the vehicle. When considering the front axle this is easily attained, as owing to the steering coupling rod alone being attached to the arms of the left hand stub end and the steering coupling rod in addition to the steering rod, (that is, the connection from the stub end to the steering segment) being attached to the arms of the right hand stub end, it would be immediately noticed if the stub ends had been fitted to the wrong sides of the vehicle as it would be quite impossible to connect up the steering gear, and so the mistake, if made, would be discovered before the vehicle could be taken upon the road. For a front axle, therefore, it is only necessary to arrange that the stub ends upon opposite sides of the vehicle are different in respect to the attachment of the inner permanent hub part, and that the respective permanent hub parts can only be affixed to the particular stub end for which they are intended.

Figure 2:
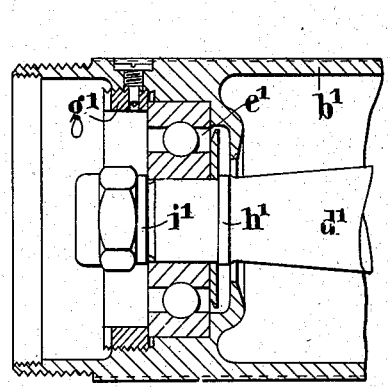
Figure 3:
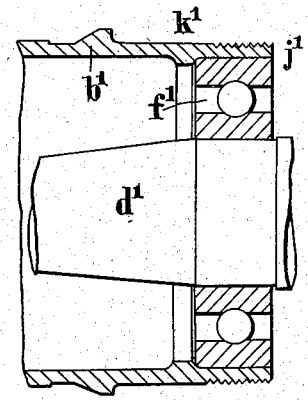
Figure 4:
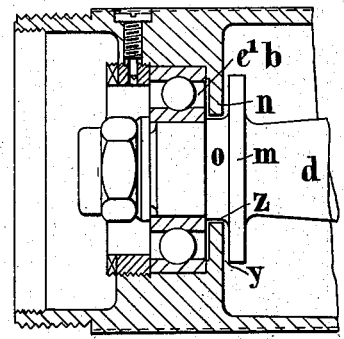
Figure 5:
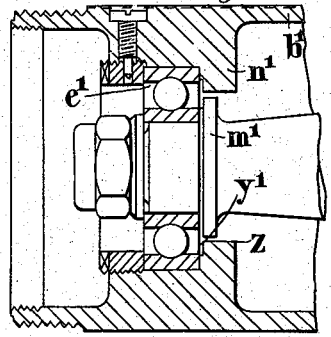

Referring now to the accompanying drawings: Figure 1 shows a complete hub and an axle end for one side of a vehicle, and Figs. 2 and 3 show portions of hubs for the opposite side of the vehicle illustrating alternative arrangements of one way of carrying the invention into effect. Figs. 4 and 5 show a collar on the axle and an inturned flange of the inner hub part which overlap one another on an annular and a cylindrical surface in the two figures respectively. Figs. 6 and 7 show annular and cylindrical overlapping surfaces provided on the bearing retaining means of the axle and inner hub.

Figure 13:
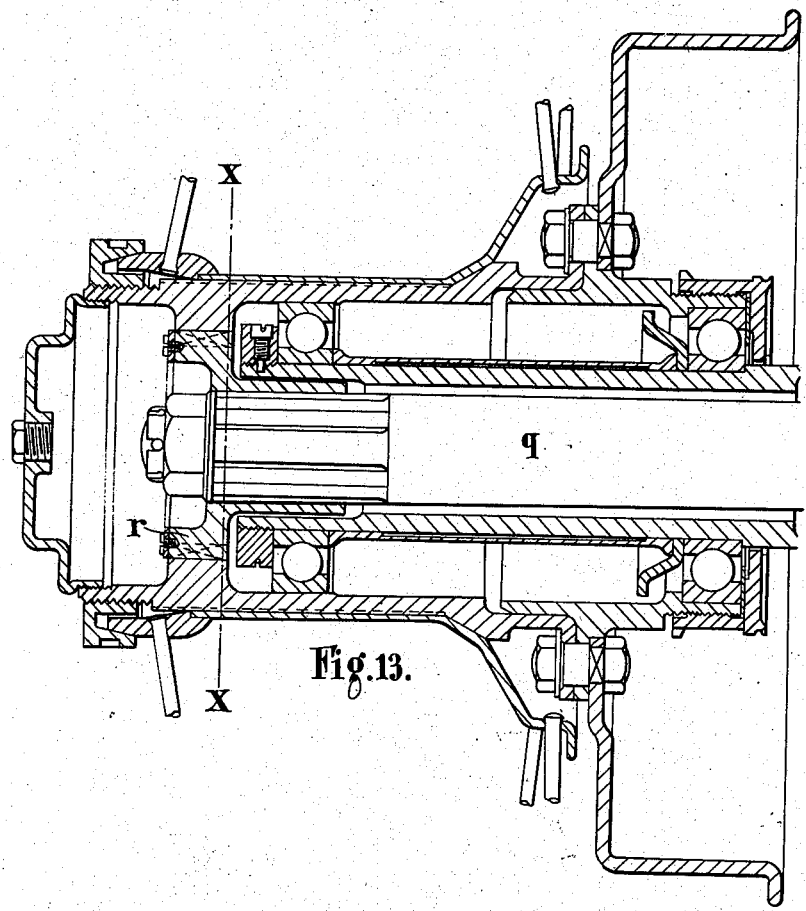
Figure 14:
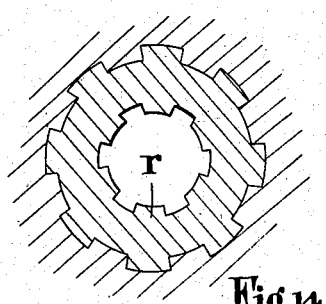
Figure 15:
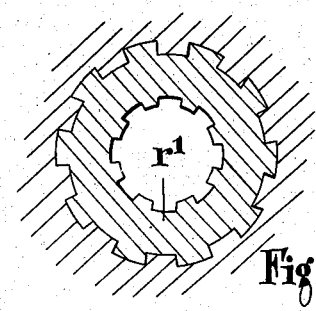
Figure 16:
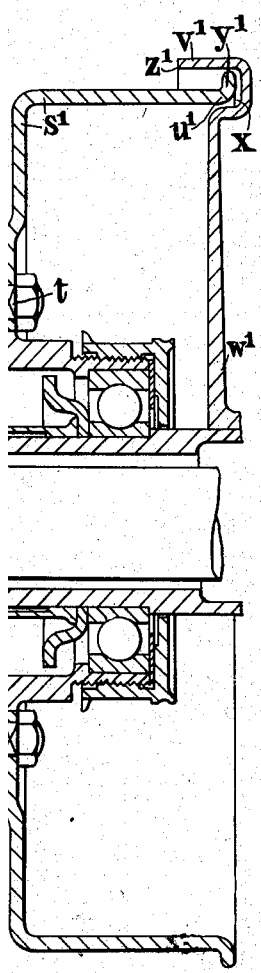
Figure 17:
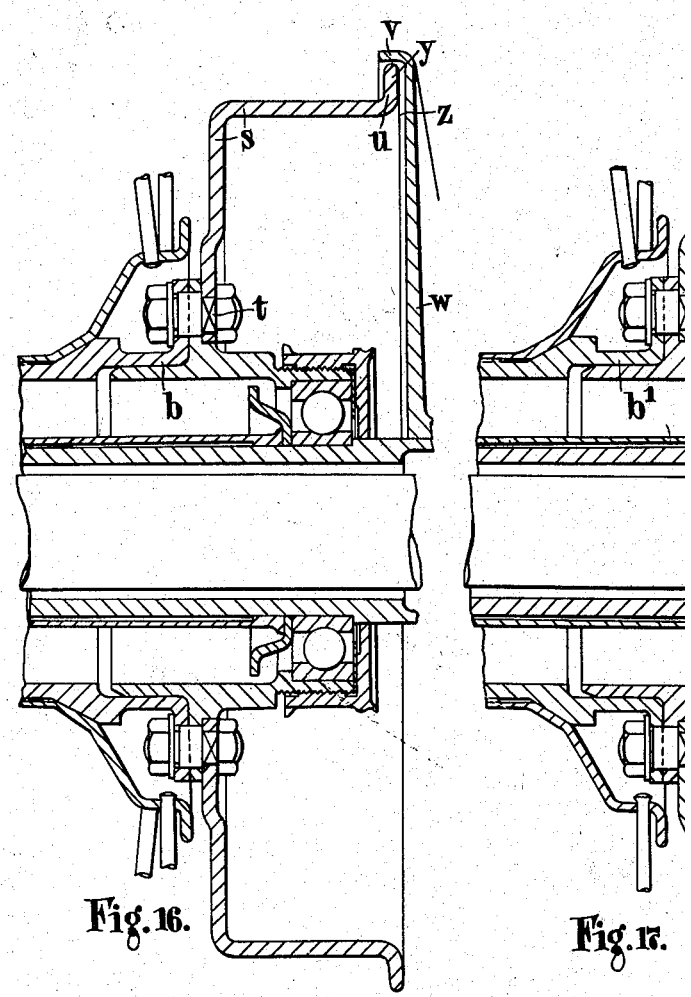

Figs. 8 and 9 show the bearing retaining means of the axle co-acting with the inner hub shell itself by means of overlapping surfaces. Figs. 10, 11, and 12 show a construction in which a notched collar on the axle passes through a complementary orifice in a flange of the inner hub. Figs. 13, 14 and 15 show the invention carried into effect on a driving axle, and Figs. 16 and 17 illustrate a method by which the brake drum and its cover are utilized.

In carrying the invention into effect in one manner as shown by way of example in Figs. 1, 2 and 3, an outer hub part, $a$, is mounted upon an inner hub part, $b$, and retained thereon by a nut, $c$, as described in the beforementioned patents. The stub axle end, $d$, carries the inner hub, $b$, by means of the ball bearings, $e$ and $f$. Fig. 1 shows the hub and axle end for, say, the left hand side of the vehicle, and Fig. 2 is a fragmentary view of the outer bearing upon the right hand side of the vehicle. It will be seen that the outer ball bearings, $e$ and $e'$ are of different diameters internally and externally for the opposite sides, and it is easy to render it impossible to fit the smaller size bearing $e$ within the inner hub $b'$ by making the nut or screwed ring $g'$, which retains the bearing in position, of such an internal diameter that it will not grip the smaller size bearing, $e$. It is of course obvious that the larger size bearing, $e'$, cannot be placed within the recess in the hub part, $b$, intended for the smaller one. Having made it impossible to fit an incorrect outer bearing to the inner hub parts, the fact that the internal diameters of the bearings are different will also make it impossible to fit them upon the wrong axle ends, the same method being adopted of making the gripping members, $h'$ and $i'$, for the bearing, $e'$, which has the smaller bore, of such diameters that they are incapable of retaining in position the bearing $e$, with the larger bore. If preferred, the foregoing arrangement may be applied to the inner ball bearings instead of to the outer ones when, as shown in Fig. 3, the recess, $j'$. and internal shoulder $k'$, which hold the bearing $f$, are so large that the bearing, $f$, would fall through if applied to them, while the bearing $f'$, would slip over the shoulder, $l$, formed upon the axle end, $d$. The bearing $f$, cannot be put upon the axle end, $d'$ or the bearing, $f'$, into the inner hub part, $b$. Another way of carrying out the invention is to provide co-acting projections on a rotating and a non-rotating member respectively, which, when a wheel is in position, overlap one another upon a surface of revolution which may be cylindrical, conical or disk-like. Both projections may form complete surfaces or portions or boundaries thereof provided the projections of a non-rotating part on one side will form an obstacle to the passage of the projection of a rotating part of the other side. If the overlapping surfaces of revolution or surface of overlapping on the two sides of the vehicle are at right angles or otherwise inclined to each other, and each pass through and extend in both directions from a point in a corresponding position, it will be clear that the two surfaces would intersect if the parts for both sides could be super-imposed, and that therefore when formed as above described, the projections will prevent an incorrect assembling of the parts.

As shown in Figs. 4 and 5 such arrangements may consist in providing a collar, $m'$, of small diameter and immediately adjoining the inner face of the outer ball bearing, $e'$, upon the right hand side stub axle, and providing the inner hub part, $b'$, for that side with an internal flange, $n'$, of such diameter that it will just pass over the collar, $m'$, and of such a width that when in position it will extend in a longitudinal direction some distance beyond the collar as shown in Fig. 5. The left hand stub axle is provided with a collar, $m$, (Fig. 4) of larger diameter than $m'$, and placed a short distance farther back from the outer end of the axle, so as to leave a part, $o$, of small diameter between the inside of the outer bearing, $e$, and the outer face of the collar, $m$. The inner hub part, $b$, is provided with an internal flange, $n$, of such thickness and internal diameter that it will occupy the space between the collar, $m$, and bearing, $e$, and just clear the part, $o$, before mentioned. The internal diameter of $n$ is such, however, that it will not pass the collar, $m'$, of the right hand axle end. The surface of overlapping in Fig. 4 is disk-like, lying between the boundaries, $y$ and $z$, and in Fig. 5 it is cylindrical, being between the boundaries $y'$ and $z'$ so that both surfaces pass through a corresponding point midway between the boundaries, and would intersect one another could the parts for both sides be superimposed. If, however, an attempt is made to place a left hand hub part $b$ upon a right hand axle end, $d'$, the internal flange, $n$, of the hub part will come into contact with the collar, $m'$, of the axle end and prevent the hub going on far enough to screw the nut up, while if a right hand hub part, $b'$, is placed upon a left hand axle end, $d$, the smaller internal diameter of the thicker inturned flange, $n'$, of the hub will not pass over the outside of the larger diameter collar, $m$, and it will again be impossible to put the hub part on far enough to screw up the nut.

In the arrangement illustrated in Figs. 6 and 7, the axle ends, $d$ and $d'$ on opposite sides are provided with different types of screw threads for the nuts. $n$ and $p'$, which retain the outer ball bearings, e and e', so that the nut, p', for the left hand side cannot be placed upon the axle, d', on the right hand side or vice versa. The rings $g^2$ and $g^3$ for retaining the ball bearings, e and e' in the hub parts are also provided with different types of screw threads so that they can only be used in the particular hub part for which they are intended. The nut, p', upon the right hand side is provided with a wide collar of small diameter which, when the nut is in position on the axle, lies within the bore of the retaining ring, $g^3$, of the hub part, b', with a cylindrical surface of overlapping, y', z' while the nut, p, upon the left hand side is provided with a collar formed in two steps of different diameters as shown, one step being of a larger and the other of a smaller diameter than the collar on the nut, p'. The retaining ring, $g^2$, for the left hand hub part, b, is stepped internally to correspond with the collar so that when the nut, p, is in position the collar is contained within the retaining ring $g^2$, with the stepped parts accommodating one another, and providing a disk-like surface of overlapping, y, z. If a right hand hub, b', is put upon a left hand axle end, d, the nut, p, cannot be screwed home owing to the larger diameter step of the nut fouling the smaller diameter bore of the retaining ring $g^3$. Likewise, if the left hand hub part, b, is put upon the right hand axle end, d', the collar of the nut, p', will not pass the smaller diameter step of the retaining ring, $g^2$, and the nut cannot be screwed home as in the former case. The foregoing arrangement of a plain collar upon one nut and a stepped collar upon the other nut may be used in connection with correctly arranged recesses in the inner hub parts themselves and without differentiating the retaining rings.

In Figs. 8 and 9 the nuts, $p^2$ and $p^3$ are each provided with a different type of thread to engage the axle ends, d and d', so that they are not interchangeable. The nut $p^2$, on the left hand side has a collar stepped in two diameters coöperating with suitable recesses in the hub part, b, and the nut, $p^3$, on the right hand side has a plain collar, of a diameter intermediate between the two diameters of $p^2$, the hub part, b', being formed with one deep recess to accommodate the nut, $p^3$. The result is exactly the same as that already described in connection with Figs. 6 and 7.

In another way of carrying the invention into effect which is shown in Figs. 10, 11 and 12, collars $m^2$ and $m^3$ respectively are provided upon the left hand and the right hand stub ends of the axle, the collars being of the same diameter on the axle, as shown at m, (Fig. 10). The two hub parts are provided with inturned flanges, $n^2$ and $n^3$, respecside, and eight bolts upon the right hand side. The brake drum, *s'*, upon the right hand side is formed with a small external flange, *u'*, upon its inner edge. This flange just fits within a rim, *v'*, forming the outer side of an annular recess, *x*, which is set back on the flat face of the brake drum casing, *w'*, providing a cylindrical surface of overlapping, *y'*, *z'*. The brake drum, *s*, upon the left hand side is provided with a flange, *u*, of larger diameter than the flange, *u'*, but the drum *s*, itself is not so wide as the drum, *s'*. The drum casing, *w*, on the left hand side is only provided with an ordinary rim, *v*, and has no set back recess, the surface of overlapping being disk-like as indicated by *y* and *z*. If an attempt is made to place a left hand hub upon the right hand side of the vehicle, the larger external flange, *u*, of the brake drum will not pass the smaller diameter rim *v'*, whereas if a right hand hub part were tried upon the left hand side there would be no set back annular recess, *x*, to accommodate the wider drum which would in consequence come in contact with the casing, *w'*, before the hub part was home upon the axle. In this arrangement it is of course necessary in order to avoid mistake, to provide that the brake drum casings differentiate from one another in some manner in their attachment to the vehicle.

In all of the foregoing arrangement it will be seen that it is not only impossible to fit a right hand hub part upon the left hand side of the vehicle, but also that a left hand hub part cannot be used upon the right hand side. In some instances, however, it may be sufficient to provide that only one of the hub parts cannot be used upon the opposite side. This arrangement does not, however, offer as great advantages as the former, particularly where replacements have to be effected.

It will be clear that the previously described methods form only some ways of carrying the invention into effect, and that many others may be adopted without in any way departing from the spirit of the invention.

Having now described my invention, what I claim as new and desire to secure by Letters Patent is:—

1. In combination a wheel hub for a certain side of a vehicle, a set of components for operatively mounting the same, complementary faces whereby said hub and components coöperate one with the other and a corresponding hub and set of components for the other side of said vehicle in which the complementary faces are purposely differentiated to prevent the interchange of said hubs.

2. In combination a wheel hub and components for operatively mounting the same on the right hand side of a vehicle, complementary faces whereby said hub and components coöperate one with the other, a corresponding hub and components for the left hand side of said vehicle and complementary faces to said last named members differing from those of the first named in a plurality of dimensions.

3. In combination an axle end which is restricted to a certain side of a vehicle, a wheel hub for mounting thereon, complementary faces belonging to said hub and axle which coöperate for the attachment of said hub, and a corresponding hub and axle for the opposite side of said vehicle with complementary faces performing similar functions but of different proportions to prevent the interchange of hubs.

4. In combination an axle end which is restricted to a certain side of a vehicle, a wheel hub for mounting thereon, a member intermediate between said axle and hub and having a face complementary to a face provided upon each, and a corresponding axle, hub, and intermediate member for the opposite side of said vehicle, wherein the complementary faces are purposely differentiated from those first named.

5. In combination an axle end for the right hand side of a vehicle, a turned element provided upon said end, an axle end for the left hand side of the vehicle, a corresponding turned element of different proportions upon said left hand axle, and a wheel hub provided with a turned part complementary to one of said turned elements but which will not coöperate with the other.

6. In combination an axle end for one side of a vehicle having a surface, an annular device carried on said surface, a wheel hub having an internal recess holding said device, inwardly projecting means preventing axial movement of said device in said recess, an axle end for the other side of said vehicle having a surface of different diameter from said last named surface, an annular device carried thereon which is of smaller diameter than said movement preventing means and a wheel hub having a recess fitting and retaining said last named annular device.

7. In combination an axle end for one side of a vehicle, a cylindrical surface on said end, a ball bearing fitting said surface, a wheel hub having a recess wherein said bearing fits, an axle end for the other side of a vehicle, a cylindrical surface thereon of different diameter from said first named surface, a wheel hub having a recess of different diameter to said first named recess and a ball bearing fitting upon said last named surface and within said last named recess.

8. In combination an axle end for one side of a vehicle, a cylindrical surface on said end, a ball bearing fitting said surface, gripping members preventing movement of said bearing thereon, a wheel hub having a recess wherein said bearing fits, a ring retaining said bearing in said recess, an axle end for the other side of a vehicle, a cylindrical surface thereon of larger diameter than said gripping members, a wheel hub having a recess which is smaller than the inner diameter of said ring and a ball bearing fitting within said last named recess and upon said last named cylindrical surface.

9. In combination an inner hub part of a detachable wheel for the right hand and one for the left hand side of a vehicle, axle parts on opposite sides of said vehicle, and ball bearings supporting said hub parts upon said axle parts, said bearings being of different dimensions on the opposite sides of the vehicle, whereby a hub part can only be mounted on the axle part for which it is intended.

10. In combination an inner hub part of a detachable wheel for the right hand and one for the left hand side of a vehicle, an axle part applicable to the right hand and one applicable to the left hand side of said vehicle, a ball bearing between the axle part and hub part on the right hand side and a similarly positioned ball bearing of different internal and external diameters for the hub part and axle part on the left hand side.

11. In combination an inner hub part of a detachable wheel for the right hand and one for the left hand side of a vehicle, an axle part applicable to the right hand and one applicable to the left hand side of said vehicle, a ball bearing between the axle part and the outer end of the hub part on the right hand side, and a similarly positioned ball bearing of different internal and external diameters for the hub part and axle part on the left hand side.

12. In combination an inner hub part of a detachable wheel for the right hand and one for the left hand side of a vehicle, an axle part applicable to the right hand and one applicable to the left hand side of said vehicle, a ball bearing between the axle part and hub part on the right hand side and a similarly positioned ball bearing of different dimensions for the hub part and axle part on the left hand side.

13. In combination an axle end for one side of a vehicle, an annular member positioned thereon, a wheel hub provided with a face complementary to part of said member, and a corresponding axle end, annular member, and hub for the other side of said vehicle co-acting as the above but differentiated from said first named parts in respect to the proportions of their co-acting faces.

In testimony whereof I affix my signature in presence of two witnesses.

JOHN VERNON PUGH.

Witnesses:
WILLIAM BLAIR,
MABEL ETHEL COOKE.